United States Patent

Vogelpohl

[11] Patent Number: 5,837,141
[45] Date of Patent: Nov. 17, 1998

[54] PROCESS FOR THE BIOLOGICAL TREATMENT OF WASTE WATER

[75] Inventor: Alfons Vogelpohl, Clausthal-Zellerfeld, Germany

[73] Assignee: Technische Consult TECON GmbH, Germany

[21] Appl. No.: 736,552

[22] Filed: Oct. 24, 1996

[30] Foreign Application Priority Data

Oct. 26, 1995 [DE] Germany .......... 195 39 758.4
Aug. 31, 1996 [DE] Germany .......... 196 35 443.9

[51] Int. Cl.⁶ .......... C02F 3/20
[52] U.S. Cl. .......... 210/629; 210/197; 210/199
[58] Field of Search .......... 210/621, 629, 210/197, 199, 205, 220, 221.2

[56] References Cited

U.S. PATENT DOCUMENTS

| | | | |
|---|---|---|---|
| 3,865,721 | 2/1975 | Kaelin | 210/629 |
| 4,278,546 | 7/1981 | Roesler | 210/629 |
| 4,338,197 | 7/1982 | Bolton | 210/629 |
| 4,517,093 | 5/1985 | Leistner et al. | 210/629 |
| 4,954,257 | 9/1990 | Vogelpohl et al. | 210/629 |
| 5,364,530 | 11/1994 | Gaddis | 210/629 |

FOREIGN PATENT DOCUMENTS

| | | |
|---|---|---|
| 0164508A1 | 12/1985 | European Pat. Off. . |
| 0 130 499 | 6/1987 | European Pat. Off. . |
| 0475540A1 | 3/1992 | European Pat. Off. . |
| 3413537A1 | 10/1985 | Germany . |
| 40 12 300 | 10/1991 | Germany . |

OTHER PUBLICATIONS

Bayer, Dr. Otto; Chem.–Ing.–Tech. 54 ("Chemical Engineer Technology 54"), 1982, No. 11, pp. 939–952.

*Primary Examiner*—Thomas G. Wyse
*Attorney, Agent, or Firm*—Spencer & Frank

[57] ABSTRACT

A process and apparatus for the biological purification of waste water. The process includes the steps of providing a reaction tank having microorganisms therein. The reaction tank has at least one vertically arranged guide pipe therein. The guide pipe has open upper and lower ends, and is positioned so that the lower end is located at a distance from a bottom of the reaction tank. The waste water and a gas are supplied to the reaction tank to form a mixture. The supplying step includes the step of supplying the waste water under pressure to the guide pipe at the upper end, and the step of supplying the gas separate from the waste water at at least two positions into the guide pipe. The at least two positions are located at different levels and at positions downstream of the upper end, relative to a flow direction of the waste water. The mixture of the waste water and the gas are moved in the reaction tank in a cycle that passes through the guide pipe. The apparatus provides for a device that can perform the process.

7 Claims, 2 Drawing Sheets

PROCESS FOR THE BIOLOGICAL TREATMENT OF WASTE WATER

CROSS-REFERENCE TO RELATED APPLICATIONS

This application claims the priority of German Applications No. 195 39 758.4 filed on Oct. 26, 1995, and No. 196 35 443.9 filed on Aug. 31, 1996, which are incorporated herein by reference.

BACKGROUND OF THE INVENTION

The present invention relates to a process for the biological purification of waste water, in which the waste water and a gas are supplied to a reaction tank having microorganisms therein. At least one guide pipe is located within the tank. The guide pipe is open at both ends, and is arranged along a vertical axis and at a distance from the bottom of the reaction tank. A mixture of the waste water and the gas is moved in the reaction tank in a cycle that passes through the guide pipe. Such a configuration is known, for example, from EP 0 130 499 B1.

During the biological purification of waste water, microorganisms (also hereinafter referred to as "biomass") use oxygen to convert organic pollutants within the waste water into innocuous substances. The waste water is purified by aerating a biomass-waste water mixture in the reaction tank. During the process, the waste water and gas are continuously supplied to the tank, and a comparable amount of the biomass-water mixture is continuously removed from the tank. "Gas" is to be understood to mean air, air enriched with oxygen, or pure oxygen gas.

Organically polluted waste waters are generated due to domestic use, and from many industrial processes. As noted, for the purification of such waste waters, processes are known which eliminate the dissolved organic compounds aerobically using microorganisms. Typically, these processes are performed in flat activation (activated-sludge) basins. The drawbacks of such processes are widely known, for example, foul smells which are generated and that pollute the surrounding area, high noise levels, large space requirements, and high investment and energy costs.

Furthermore, it is known to purify waste water in tall cylindrical towers similar to a bubble column (see, for example, DE-Z "Chemie-Ingenieur-Technik" 54 (1982) ["Chemical Engineer Technology" 54 (1982)], No. 11, pages 939 to 952). However, due to the bubble column's unfavorable hydrodynamic conditions and resulting relatively poor mass transfer conditions, their organic load is relatively low. Organic load is the load of the pollutants measured in kilograms per the volume of the reaction tank and the day, and is typically measured in COD (chemical oxygen demand). With bubble columns, the COD is approximately 1 kg $COD/m^3d$. Moreover, aeration of the waste water takes place exclusively at the bottom of the tower used, which requires that the specific energy demand for this process be relatively high.

DE 40 12 300 A1 describes an arrangement for the biological purification of waste water in a closed reactor. A mixture of waste water, a gas which includes oxygen, and a biomass are supplied to an inner flow guide pipe of the reactor via a dual-material nozzle, in a lower region of the reactor. A portion of the waste water that is to be treated is injected by nozzle into an annular space formed between the flow guide pipe and the wall of the reactor. Moreover, a portion of the thus treated mixture is continuously fed into a separate mixing and deaeration tank. By introducing the mixture of waste water, gas and biomass at a position disposed in the lower region of the flow guide pipe, the flow guide pipe essentially does not have any gas in its upper region. Thus, in the upper region, oxygen can not be transferred into the waste water or into the mixture. As a result, the mass transfer of this process is relatively poor in spite of the loop operation which is provided by this arrangement.

With the process according to EP 0 130 499 B1 described above, a markedly higher conversion is accomplished in the treatment of waste water, with an ambient pollution of up to 70 kg $COD/m^3d$ resulting. The reaction tanks used in this process are identified as "loop reactors." These reaction tanks are cylindrical tanks that are arranged vertically. The interiors of the reaction tanks are additionally provided with a flow guide pipe which is open at both ends and which extends along a vertical axis.

During the operation of this loop reactor, a loop flow (cycle) is generated around the guide pipe, thus mixing the liquid and gas therein. Advantages of such a loop flow are a relatively homogenous flow of the two phases (liquid and gas), and a resulting high transfer of the oxygen required for the purification or treatment of the waste water from the gas into the liquid.

In this known process, the gas is admitted into the top of the guide pipe, so that the gas passes through a complete loop at least once before it can leave the reaction tank. However, with this process, a large energy input is required to supply the liquid to the guide pipe, since the gas that is admitted and divided into bubbles is transported in a downward direction, with the loop flow being opposite to the ascending movement of the gas.

SUMMARY OF THE INVENTION

It is an object of the invention to provide a process of treating waste water in which energy expenditures are reduced, and in which mass transfer is improved.

This object is accomplished according to the invention in that the waste water is supplied under pressure to the guide pipe at an upper end thereof (as viewed relative to the normal operating position of the guide pipe), while, separately from the waste water, the gas is admitted into the guide pipe at at least two positions that are disposed downstream of an admission region of the waste water, at different levels, and in the flow direction of the waste water.

In this process, the gas is supplied to the guide pipe at positions that are disposed downstream of the position where the waste water is admitted, for example, using a pump, and in the flow direction of the waste water. This spatial separation of the feed-in positions of the waste water and the gas, and the particular distribution of the gas that is introduced, causes the gas to be carried along during the downward movement of the waste water or liquid present in the guide pipe, without a large energy input.

It is particularly advantageous if the predominant amount of the gas supplied is fed into a lower region of the guide pipe. The gas is then essentially directly entrained by the liquid that leaves the bottom of the guide pipe. Because of the strong swirling of the liquid during the transition from the guide pipe into the annular space surrounding the pipe, a good dispersion of the gas is ensured. As a result, a separate dispersion device such as, for example, an annular distributor or a diaphragm distributor, is eliminated.

For supplying gas predominantly to the lower end of the guide pipe, the principle of the mammoth pump is utilized. This minimizes the energy that is required to maintain the loop flow.

Moreover, by supplying a sufficient amount of gas in the upper region of the guide pipe, and by recirculating the liquid at a predetermined setting using a pump, it can be ensured that the predominant portion of the gas rising in the annular space is aspirated back into the guide pipe. This causes a high gas circulation and, simultaneously, a complete aeration of the entire reaction chamber.

The invention will be described below in greater detail in connection with embodiments thereof that are illustrated in the drawing figures.

DETAILED DESCRIPTION OF THE PREFERRED EMBODIMENTS

Figure 1:
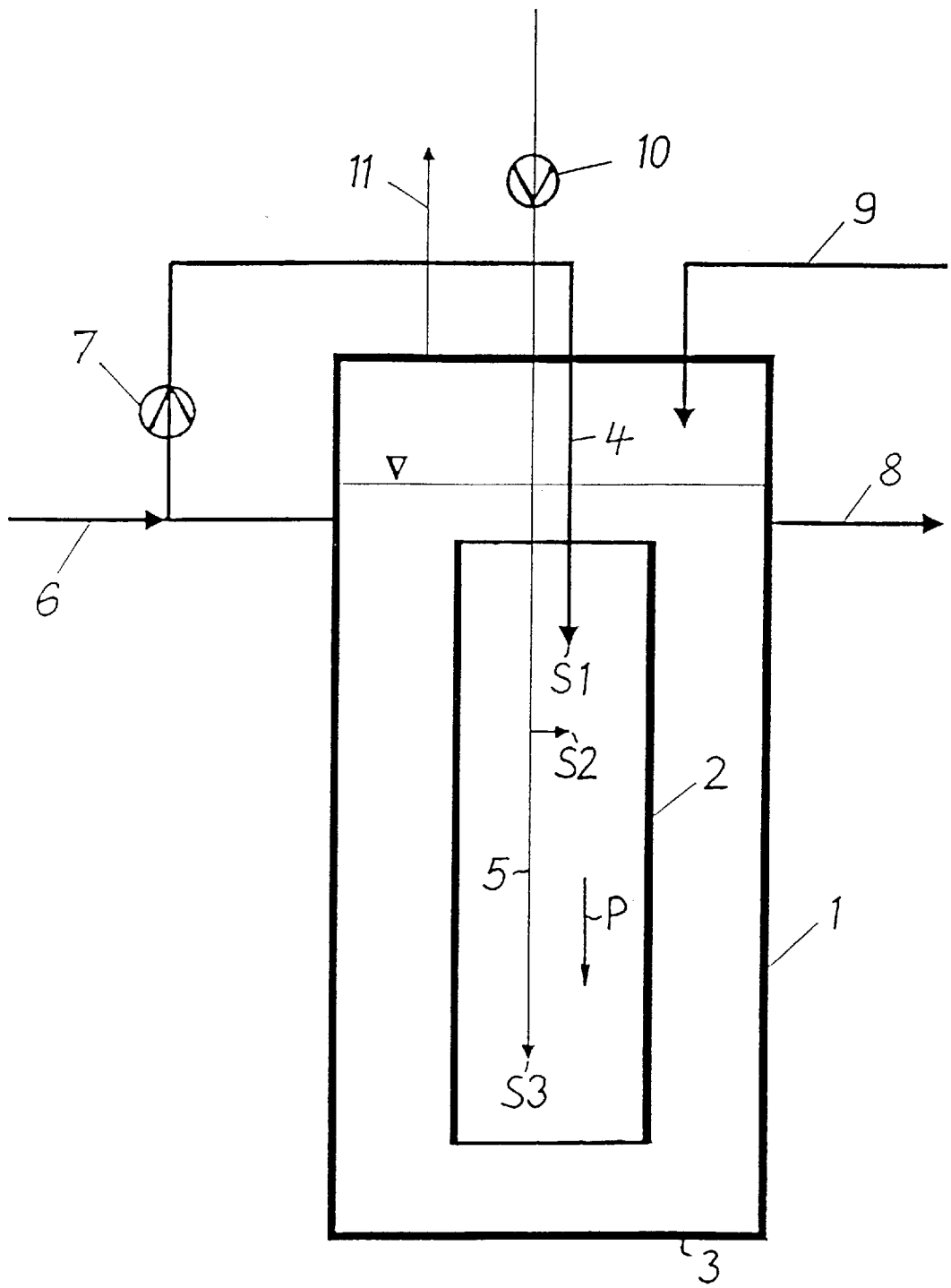
FIG. 1 is a schematic of the arrangement used for implementing the process according to the present invention.

Referring to the Figures, and particularly to FIG. 1, a guide pipe 2 having a vertical, longitudinal axis, is arranged in a reaction tank 1. The guide pipe 2 is open at both ends. The lower end of the guide pipe 2 is separated from the bottom 3 of the reaction tank 1 by a sufficient distance, so that the liquid that is present in the reaction tank can be moved in a cycle that passes through the guide pipe 2. The liquid is a biomass-water mixture.

The waste water that is to be purified is supplied to the guide pipe 2 via a conduit 4. The waste water enters the guide pipe 2 at the position S1. Additionally, gas is admitted into the guide pipe 2 via at least one conduit 5, with the gas exiting at positions S2 and S3. The positions S1, S2 and S3 are spatially separated from one another. In this figure, the positions S2 and S3 are disposed in the guide pipe 2 downstream of the position S1 in the direction of flow P of the waste water. However, the gas may alternatively be delivered to positions S2 and S3 via two separate feeder pipes.

The process according to the invention operates, for example, in the following manner:

The waste water that is to be purified (raw waste water) is delivered via a pipe 6, and preferably together with liquid taken from the reaction tank 1, to a conduit 4, and is thereafter supplied to the guide pipe 2. If the velocity of the waste water, which can be set with a pump 7, is sufficient, a loop flow is generated around the guide pipe 2. The purified waste water together with the biomass thereafter leaves the reaction tank 1 via a conduit 8.

In a downstream arrangement, not shown, the waste water and biomass are separated again. The predominant portion of the biomass is returned to the reaction tank 1 via a conduit 9. The remainder of the biomass is taken out as excess sludge.

The oxygen necessary for the waste water purification is introduced as a gas (typically air, or enriched or pure oxygen gas) into the guide pipe 2 of the reaction tank 1 via the conduit 5. The conduit 5 may be fed into the guide pipe 2 from the top, as shown in FIG. 1, but it may also be fed in laterally.

The mouth (exit opening) of the conduit 5 is disposed in the lower region of the guide pipe 2, and preferably in the lower fifth of the guide pipe.

Depending on the height of the two-phase layer in the reaction tank 1, the gas is compressed to a greater or lesser extent using a pump 10. The dispersion of the gas takes place at the position S2 through a shearing effect of the waste water exiting at the position S1, and at the position S3 due to the 180 degree deflection of the liquid at the lower end of the guide pipe 2. At a particular velocity of the liquid exiting from the conduit 4, a predominant portion of the gas which rises in the annular space of the reaction tank 1 surrounding the guide pipe 2 is aspirated back into the guide pipe 2, thus accomplishing a recirculation of the gas. An amount of gas, corresponding to an amount of gas that is supplied, leaves the reaction tank 1 via a conduit 11.

Figure 2:
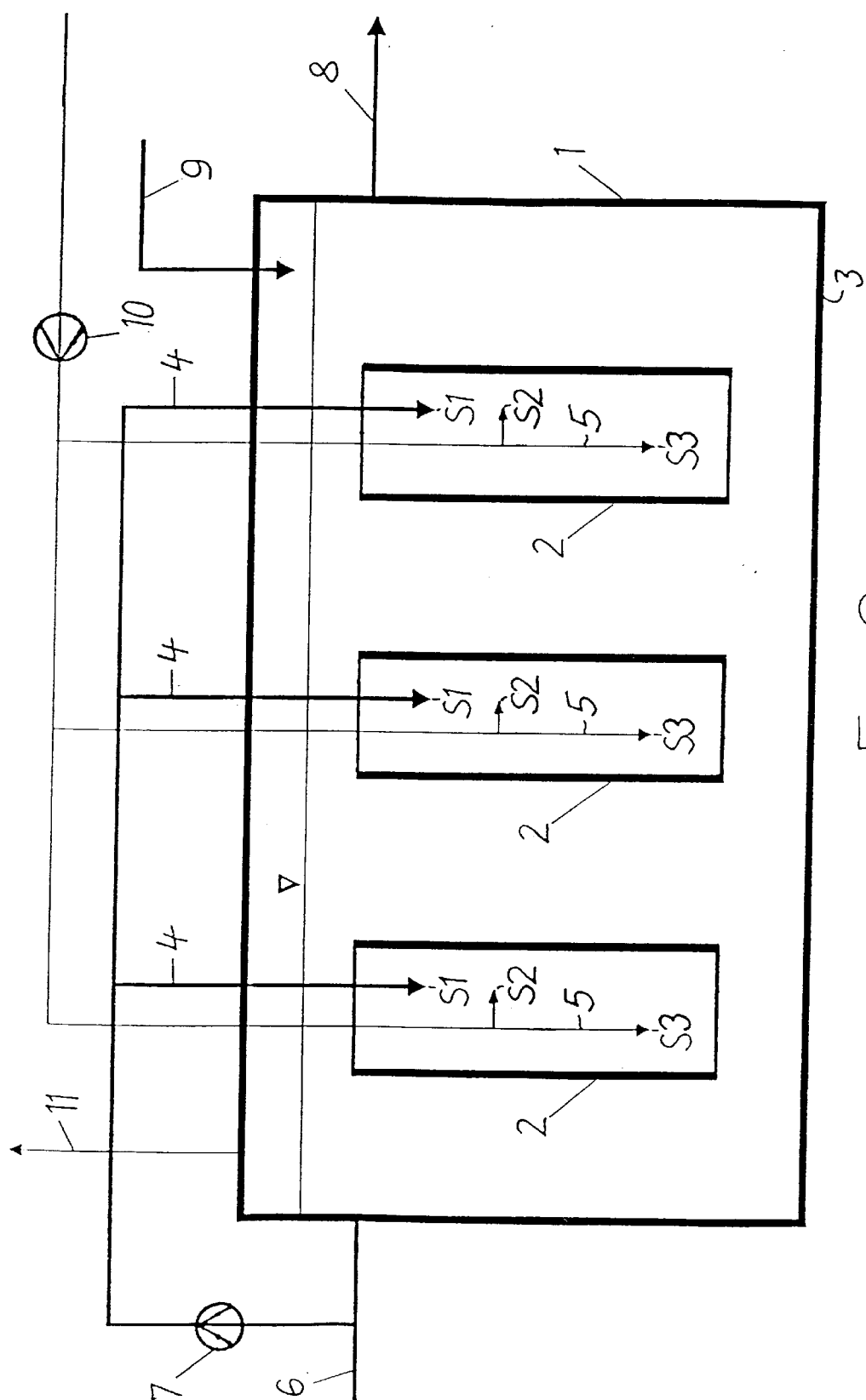
FIG. 2 is a system which is expanded compared to FIG. 1.

Referring now to FIG. 2, since both the ratio of height-to-diameter of the reaction tank 1 and of the guide pipe 2, and the velocity of the liquid in the guide pipe 2 must comply with specific values for reasons of fluid dynamics, and since the structural height of the reaction tank 1 and the guide pipe 2 is limited for energetic reasons, two or more guide pipes 2 with corresponding feeder conduits 4, 5 may be arranged in a reaction tank 1 for treating large amounts of waste water. As shown in this figure, three guide pipes 2 may be provided.

The installation of a plurality of guide pipes 2 into a reaction tank 1 has the additional advantage that the dispersion of the gas in the respective guide pipes 2 admitted at the positions S2 and S3 is reinforced by an impact effect occurring when the flows of the deflected liquid collide with one another.

It will be understood that the above description of the present invention is susceptible to various modifications, changes and adaptations, and the same are intended to be comprehended within the meaning and range of equivalents of the appended claims.

What is claimed is:

1. A process for the biological purification of waste water, comprising the steps of:

providing a reaction tank having microorganisms therein, and having at least one vertically arranged guide pipe therein, the guide pipe having open upper and lower ends, and being positioned so that the lower end is located at a distance from a bottom of the reaction tank;

supplying the waste water and a gas to the reaction tank to form a mixture, said supplying step including:

supplying the waste water under pressure to the guide pipe at the upper end; and supplying the gas separate from the waste water at at least two positions into the guide pipe, the at least two positions being located at different levels and at positions downstream of the upper end, relative to a flow direction of the waste water; and moving the mixture of the waste water and the gas in the reaction tank in a cycle that passes through the guide pipe.

2. The process according to claim 1, wherein one of the at least two positions is located in a region of the guide pipe where the waste water is admitted, and the other of the at least two positions is located in a lower region of the guide pipe.

3. The process according to claim 1, wherein one of the at least two positions is located in a lower region of the guide pipe, and wherein a majority of the gas is supplied to the guide pipe at the one position.

4. The process according to claim 1, wherein the waste water is supplied to the guide pipe at a high velocity using a pump.

5. The process according to claim 1, further comprising the step of removing a liquid from an upper region of the reaction tank; wherein the waste water is supplied to the guide pipe together with the liquid.

6. The process according to claim 1, wherein the at least one guide pipe comprises a plurality of guide pipes located within the reaction tank.

7. An arrangement for biologically purifying waste water, comprising:

a reaction tank having microorganisms therein;

at least one vertically arranged guide pipe located within said reaction tank, said guide pipe having open upper and lower ends, and being positioned so that the lower end is located at a distance from a bottom of said reaction tank;

a first conduit for supplying the waste water under pressure to the guide pipe at the upper end;

a second conduit for supplying the gas separate from the waste water into the guide pipe at at least two positions, the at least two positions being located at different levels and at positions downstream of the upper end, relative to a flow direction of the waste water; and means for moving a mixture of the waste water and the gas in the reaction tank in a cycle that passes through the guide pipe.

* * * * *